3,455,881
COPOLYMERS OF BIS(PERFLUOROALKYL)
KETENES WITH SELECTED ETHYLENIC
COMPOUNDS
Sam Andreades and David C. England, Wilmington, Del.,
assignors to E. I. du Pont de Nemours and Company,
Wilmington, Del., a corporation of Delaware
No Drawing. Original application Mar. 24, 1965, Ser. No
442,477. Divided and this application July 23, 1968,
Ser. No. 746,780
Int. Cl. C08g 15/00, 51/38
U.S. Cl. 260—63        12 Claims

ABSTRACT OF THE DISCLOSURE

Described and claimed are the copolymers of bis(perfluoroalkyl)ketenes with selected ethylenic compounds, e.g., copolymers of bis(trifluoromethyl)ketene and ethylene, styrene, methyl acrylate, etc. The copolymers are prepared by the direct addition polymerization of the precursor monomers in the presence of addition polymerization initiators and are useful as film- and fiber-forming materials.

RELATED APPLICATIONS

This application is a division of our copending application, Ser. No. 442,477, filed Mar. 24, 1965, as a continuation-in-part of our copending application Ser. No. 283,958, filed May 29, 1963, and now abandoned.

FIELD OF THE INVENTION

The invention relates to and has as its principal object copolymers of bis(perfluoroalkyl)ketenes with ethylenically unsaturated, addition polymerizable monomers.

BACKGROUND OF THE INVENTION

The bis(perfluoroalkyl)ketenes, precursors of the copolymers of this invention, are novel compounds described and claimed in our above-identified application Ser. No. 442,477.

DESCRIPTION OF THE INVENTION

The products of this invention are random copolymers which may be represented empirically by the formula

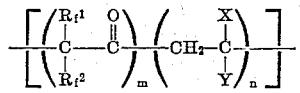

where $R_f^1$ and $R_f^2$ are perfluoroalkyl radicals, alike or different, generally of no more than 8 carbons each, X is —H, —C$_6$H$_5$, —CH=CH$_2$, —COOR, —CN, —Cl or —F, Y is —H, —F, —Cl, or —R, R being an alkyl radical of no more than 6 carbon atoms, $m$ and $n$ are the mole fractions of the respective units, $m$ being any number, including decimal fractions, between 0.1 and 50 and $n=100-m$, the molecular weight of the copolymer being no less than about 500 and there being no less than two of either component unit per molecule of copolymer. The copolymer structure is substantially linear.

It is to be understood that the above formula includes terpolymers, etc., in which the mole fractions $m$ and/or $n$ are a total made up by two or more chemically distinguishable embodiments of the respective units which differ only within the limits of $R_f^1$ and $R_f^2$ or X and Y as defined above.

The bis(perfluoroalkyl)ketenes used to prepare the copolymers of this invention are characterized by the formula

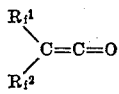

wherein $R_f^1$ and $R_f^2$ are used to represent perfluoroalkyl radicals, alike or different, generally of no more than eight carbons each. An especially preferred group of these bis(perfluoroalkyl)ketenes is represented by the following formula:

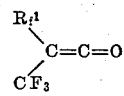

wherein $R_f^1$ has its previously described meaning.

These products are prepared by the direct pyrolysis in the presence of a chemical dehydrating agent, such as P$_2$O$_5$ or other strong dehydrating acid anhydrides, of α,α-diperfluoroalkyl-substituted acetic acids representable by the structural formula

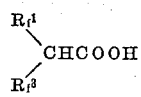

and for the preferred product scope by the said described pyrolysis/dehydration of the α-perfluoroalkyl-α-trifluoromethylacetic acids of the chemical formula

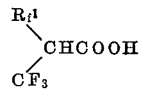

wherein the $R_f$'s have their previously defined meaning.

The necessary intermediates to the synthesis of the bis(perfluoroalkyl)ketenes i.e., the bis(perfluoroalkyl)-substituted α-hydroacetic acids, are prepared from the corresponding 2,2 - bis(perfluoroalkyl)difluoroethylenes, i.e., using the previously described radical definitions, olefins of the structure

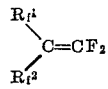

wherein $R_f^1$ and $R_f^2$ have their previously defined meaning. This conversion step from the 2,2 - bis(perfluoroalkyl) - 1,1 - difluoroethylenes to the necessary α,α-bis(perfluoroalkyl) - α - hydroacetic acid intermediates can be effected in either or both of two ways. Thus, the 2,2-bis(perfluoroalkyl) - 1,1 - difluoroethylene can be directly hydrolyzed with water and/or an aqueous acidic solution in a suitable organic solvent carrier such as tetrahydrofuran according to the following stoichiometry:

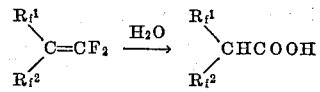

This technique functions best with those compounds wherein the $R_f$ radicals are of relatively short carbon chain content and especially wherein at least one is CF$_3$—.

The necessary α,α - bis(perfluoroalkyl) - α - hydroacetic acid intermediates can also be prepared in a three-stage synthesis which is preferable and in some instances necessary for those compounds wherein the $R_f$ radicals contain a longer carbon chain backbone, e.g. from 3–8 carbons. This 3-stage preparation of the necessary intermediates also starts from the corresponding 2,2 - bis(perfluoroalkyl)difluoroethylene intermediates and is properly representable by the following stoichiometry:

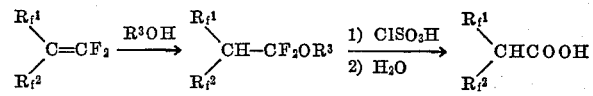

wherein the $R_f$'s have their previously defined meaning and R$^3$ is used to represent monovalent aliphatically saturated hydrocarbons, i.e., monovalent hydrocarbon radicals free of aliphatic unsaturation but specifically inclusive of aromatic unsaturation.

This is illustrated in Example A which follows:

Example A

*Part A.*—A gas (approximate composition 18% perfluoroisobutene (PFIB) and 82% perfluorocyclobutane) was passed through a cold mixture of tetrahydrofuran and water and then through methanol in a series of three 500-ml. gas-washing bottles cooled in ice baths. In each bottle the gas passed through a sintered-glass disc and then bubbled through the liquid present. Each of the first two bottles contained a mixture of tetrahydrofuran and water (100 ml. of each) and the third bottle contained 200 ml. of methanol. In five hours, 206 l. of gas was scrubbed corresponding to about 1.5 moles of PFIB. The methanol in the third scrubber was mixed with an equal amount of water and the heavy layer distilled to yield 165 g. (0.7 mole) of

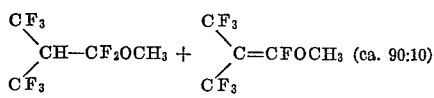

Both of the tetrahydrofuran:water scrubbers contained two phases. They were combined and the lower layer (500 cc.) separated from the upper (200 cc.). To the lower layer was slowly added 500 cc. of conc. $H_2SO_4$ and the mixture continuously extracted with methylene chloride (about 500 cc.) overnight. Distillation of the extract yielded 121 g. (0.62 mole) of α - hydrohexafluoroisobutyric acid, boiling point 90° C./190 mm., which solidified at room temperature. Allowing for the methanol adduct, the yield was 77%. Recrystallized from hexane, the acid melted at 50° C. Knunyants et al., Bull. Acad. Sci., U.S.S.R., Div. Chem. Sci., 1956, 1387, report a melting point of 49.5–50.5° C. When titrated potentiometrically, the $pK_a$ was 2.35 and the neutral equivalent 198 (theory 196).

*Part B.*—α - Hydrohexafluoroisobutyric acid (196 g.) (one molar proportion) which had been ground in a mortar was mixed well with 284 g. (2 molar proportions) of phosphorus pentoxide in a 2-l. one-neck flask with some cooling in a cold water bath. After mixing, the material was spread evenly over the bottom half of the flask. A cold-water condenser with a solid carbon dioxide trap attached was then connected to the flask which was then heated strongly for about four hours at about 200–300° C. Bis(trifluoromethyl)ketene began to collect in the solid carbon dioxide trap. A total of 110 cc. (about 175 g.; impurity 2–3% $POF_3$) was collected. On distillation through a low-temperature still the pure bis(trifluoromethyl) - ketene boiled at +5° C.; yield 168 g. (94% of theory).

It was further characterized by its infrared absorption (4.54μ, C=C=O); n-m-r (single peak at −595 cps. from difluorotetrachloroethane at 56.4 mc.); molecular weight by gas density (177.8; theory, 178).

*Analysis.*—Calcd. for $C_4F_6O$: F, 64.04. Found F, 64.06; and by reaction with water to form α - hydrohexafluoroisobutyric acid, M.P. 50° C.

When reacted in essentially the same manner as described in Parts A and B of the foregoing, the following intermediates will produce the following enumerated bis(perfluoroalkyl)ketenes. Thus, on acid hydrolysis of 7 - difluoromethylenehexacosafluorotridecane, there will be obtained bis(tridecafluorohexyl) - α - hydroacetic acid, i.e., hexacosafluoro - 7 - tridecanecarboxylic acid, which on pyrolysis/dehydration will form bis(tridecafluorohexyl)ketene. In a similar fashion, hydrolysis of 2-trifluoromethylperfluorobutene will result in the formation of pentafluoroethyltrifluoromethylacetic acid, i.e., 2H-perfluorobutanecarboxylic acid, from which by pyrolysis/dehydration as previously described, there will be obtained pentafluoroethyltrifluoromethylketene. Similarly, from 2 - difluoromethylenedecafluoro - n pentane, there will be obtained α - trifluoromethyl - α - heptafluoro-n-propylacetic acid, from which by pyrolysis/dehydration there will be obtained trifluoromethylheptafluoro - n-propylketene. Similarly, from 2 - difluoromethylenedodecafluorohexane, there will be obtained nonafluorobutyltrifluoromethylacetic acid, i.e., 2 - dodecafluorohexanecarboxylic acid, from which on pyrolysis/dehydration there will be obtained nonafluorobutyltrifluoromethylketene. Similarly, from 2,2 - bis(pentafluoroethyl) - 1,1 - difluoroethylene, there will be obtained bis (pentafluoroethyl) acetic acid, i.e., decafluoropentane-3-carboxylic acid, from which there will be obtained bis (pentafluoroethyl)ketene. Similarly, from 2 - trifluoromethyl - 2 - heptadecafluoro - n - octyl - 1,1 - difluoroethylene, there will be obtained α - trifluoromethyl-α-heptadecafluoro - n - octylacetic acid, i.e., eicosafluoro-2 - n - decanecarboxylic acid, from which there will be obtained trifluoromethylheptadeca - n -octylketene. Similarly, from 2,2 - bis(heptadecafluoro - n - octyl) - 1,1-difluoroethylene, there will be obtained α,α - bis(heptadecafluoro - n - octyl)acetic acid, i.e., tetratriacontafluoro - 9 - heptadecanecarboxylic acid, from which there will be obtained bis(heptadecafluoro - n - octyl)ketene.

The failure of the bis(perfluoroalkyl)ketenes to dimerize under conventional conditions is especially unusual and serves to point up the completely unpredictable properties exhibited by these bis(perfluoroalkyl)ketenes, not only when compared with the somewhat analogous bis(trifluoromethyl)thioketene of U.S. Patent 3,275,609 of Raasch, but also in the completely generic sense when compared with all other known ketenes. Thus, insofar as those skilled in the ketene art are concerned, ketenes generically dimerize. The following statement is quoted in support of this point from the recognized definitive literature review on ketenes and the chemistry thereof appearing in vol. III of "Organic Reactions" in the section headed "Preparation of Ketenes and Ketene Dimers" by Hanford and Sauer at page 127, John Wiley & Sons, N.Y., 1946:

"All known ketenes dimerize when heated or allowed to stand at room temperature or below for a sufficient length of time."

In contrast to this art-expected property and in contrast to bis(trifluoromethyl)thioketene and likewise other known ketenes upon exposure to known dimerization conditions, bis(trifluoromethyl)ketene is recovered completely unchanged after heating for as long as eight hours at 250° C. in a sealed neutral nonbasic glass reactor.

Despite the fact that the bis(perfluoroalkyl)ketenes, bis(perfluoromethyl)ketene in particular, can be neither dimerized nor homopolymerized by any known techniques, including thermal and free-radical catalyzed, they are, very surprisingly, also generically useful in the preparation of film- and fiber-forming copolymers with certain ethylenically unsaturated, addition polymerizable monomers by conventional free-radical polymerization techniques. This facile copolymerization of the bis(perfluoroalkyl)ketene monomers with other ethylenically unsaturated comonomers under free-radical conditions is still further surprising in that the structurally somewhat related bis(perfluoroalkyl)thioketene monomers, e.g., bis(trifluoromethyl)thioketene, of the above-mentioned patent of Raasch are not polymerizable or copolymerizable by free-radical techniques, and also spontaneously dimerize and homopolymerize, the latter under ionic initiation. Thus, the thioketene monomers are homopolymerized with a Lewis base catalyst at low temperatures to give a recurring unit of

and furthermore do not copolymerize. On the other hand, the bis(perfluoroalkyl)ketenes, e.g., bis(trifluoromethyl) ketene, are copolymerized by free-radical catalyst in the usual temperature ranges for such polymerizations of 50–150° C. and preferably 70–130° C., and afford copolymers containing recurring combined perfluoroalkylketene units of the structure

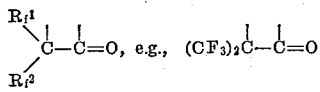

Generally, the copolymers of this invention contain about 0.1 to about 50 mole percent of the combined bis(perfluoroalkyl)ketene units.

In addition to the following specific illustrations, the addition polymerizable, ethylenically unsaturated comonomers, i.e., addition polymerizable, ethylenically unsaturated compounds copolymerizable with the perfluoroalkylketenes, for use in preparing the presently involved copolymers can best be described in the following formula:

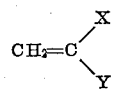

where X is used to represent H—, $C_6H_5$—, —CH=CH$_2$, —COOR, —CN, —Cl, and —F, and Y is used to represent —H, —F, —Cl, and R— where R— is used to represent a monovalent hydrocarbon radical, particularly an alkylhydrocarbon radical of no more than six carbons. Suitable specific additional copolymerizable monomers include, for instance those where X=CN and Y=R, e.g., methacrylonitrile; where X=CN and Y=chloro, i.e., α-chloroacrylonitrile; where X=—CH=CH$_2$ and Y=Cl, i.e., chloroprene; where X=—CH=CH$_2$ and Y=F, i.e., fluoroprene; where X=—CH=CH$_2$ and Y=R, e.g., isoprene; where X=$C_6H_5$ and Y=R, e.g., α-methylstyrene; where X=$C_6H_5$ and Y=Cl, i.e., α-chlorostyrene; where X=COOR and Y=Cl, e.g., methyl α-chloroacrylate; where X=Cl and Y=F, i.e., 1-chloro-1-fluoroethylene; and the like.

As to polymerization, the temperature, type of catalyst, structure of polymeric product, and behavior between the perfluoroalkylketenes and the superficially structurally related thioketene monomers are entirely and internally self-contradictory. For instance, the thio compounds spontaneously dimerize at low temperatures and homopolymerize with ionic (Lewis base) catalysts with such critical temperature control that at temperatures about 0° C., only dimer, and no homopolymer is obtained. On the other hand, the perfluoroalkylketenes cannot be made to homopolymerize and only copolymerize in a free radical-initiated system with certain ethylenically unsaturated, addition polymerizable comonomers; whereas, the thio compounds only homopolymerize and only with a fundamentally different catalyst system in an entirely different temperature range, and in addition do not copolymerize no matter under what conditions.

The copolymerization of the bis(perfluoroalkyl)-ketenes with selected ethylenically unsaturated, addition polymerizable comonomers will be effected under conditions normal for this art. More specifically, the copolymerizations will be carried out preferably under oxygen-free conditions, in solution or dispersion with varying proportions of the comonomers to be copolymerized. Copolymerization will be effected normally thermally, with initiation by the use of conventional free radical-generating addition polymerization initiators.

For these compositions which are to be thermally polymerized, addition polymerization initiators which are thermally activatable should be present in the polymer/monomer composition. In general, any one of more thermally activatable addition polymerization initiators can be used, in amount in excess of 0.05% up to about 5% and preferably from 0.1–2% by weight, based on the amount of addition polymerization monomer in the composition. Suitable thermal initiators include peroxy compounds, e.g., diacyl peroxides, such as benzoyl and lauroyl peroxides; dialkyl peroxides, e.g., di-tertiarybutyl peroxide; hydroperoxides, e.g., tertiary-butyl hydroperoxide; and hydrogen peroxide; metallic peroxy salts, e.g., ammonium, sodium or potassium persulfates, etc. The peroxy initiators can be used alone or in conjunction with a reducing agent to form a so-called "redox" system, for example, combinations of ferrous ion with the organic hydroperoxides; mercaptans with the organic peroxides, especially the diacyl peroxides, peroxy salts, e.g., persulfates, in conjunction with bisulfate ion, and the like. Other suitable thermal initiators include azo initiators, e.g., azonitriles such as α,α'-azodiisobutyronitrile and 1,1'-azodicyclo hexanecarbonitrile; benzalazine; etc.

The polymerization temperature required for such compositions depends on both the particular initiator and polymerizable monomeric component involved in the system, primarily on the former. During the addition thermal polymerizations, the temperature will normally be within the range 0° C. to 250° C. and generally at 35° C. to 150° C. depending upon the type of initiator used. For instance, with the diacylperoxide initiators the temperatures will normally range from 60° to 120° C.; with the persulfate or azo-type initiators temperatures will range normally from 25° to 120° C. and with the dialkyl peroxides temperatures will normally range from 100° to 150° C. The operable polymerization temperature range for these compositions can be markedly lowered (from 0° C. to 25° C. or lower by carrying out the thermal polymerization also under the influence of ultra-violet light, particularly in the case of the azo initiators.

The time of polymerization is likewise an interdependent variable depending on the particular initiator, the particular polymerizable monomer, and the temperature at which the polymerization is being effected. With the more readily polymerizable monomers and the more active initiators, especially in the higher temperature ranges, the necessary time of polymerization will be markedly lower, and conversely with the less easily polymerizable monomers, the less active initiators, and the lower polymerization temperatures the polymerization times will be markedly lengthened. Generally speaking, the normally used polymerization period will range from a few minutes to 24 hours with the preferred ranges being from 5 minutes to 2 hours.

Depending upon whether a highly rigid or flexible article is desired, the compositions to be thermally polymerized will vary markedly in the relative percentage of polymerizable monomeric component, particularly those components containing a plurality of polymerizable linkages. In many instances, the most convenient method of obtaining the flexible articles will be to incorporate into the compositions varying amounts of plasticizers normally used in the plasticization of addition polymers. Suitable plasticizers include the various di-, tri-, and low polyesters, e.g., dibutyl phthalate, dicyclohexyl phthalate, tricresyl phosphate, polyalkylene glycol dibasic acid esters, such as low molecular weight polypropylene glycol adipate, and the like.

Various inert solid substances, e.g., fillers or strengthening agents, can be incorporated into the compositions to be thermally polymerized. Suitable such substances include neutral salts, e.g., barium sulfate; powder fillers, e.g., wood flour, mica, cotton flock and carbon black; metal oxides, e.g., titanium dioxide and chromic oxide; neutral and synthetic resins, including ethylene/sulfur dioxide, polymers, phenoplasts and aminoplasts, e.g., phenol/urea/- and melamine/formaldehyde resins, some of which serve also as plasticizer components; natural and synthetic fibers, e.g., cotton, wood, glass, nylon, polyester, acrylic polymer, etc., fibers, including polyhexamethyleneadipamide; polyethylene terphthalate and polyacrylonitrile fibers, either in the form of simple fibers per se or as woven or nonwoven fabrics.

EMBODIMENTS OF THE INVENTION

The copolymers of the present invention are illustrated in specific detail by the following exemplary disclosures which are submitted to be solely illustrative of said copolymers and not limiting.

Example 1

A high-pressure reactor of internal capacity of approximately 400 cc. with a stainless steel liner was charged with 15 ml. of 1,1,2-trichloro-1,2,2-trifluoromethane as solvent, 18 g. of bis(trifluoromethyl)ketene, and 0.1 g. of di-tertiary-butyl peroxide. The bomb was then pressured with ethylene to 600 atmospheres and heated at this pressure at 130° C. for 2½ hours, during which time a pressure drop of ethylene of 56 atmospheres was observed. The bomb was cooled, vented to the atmosphere, and the product removed. The resultant suspension was filtered and the solid was washed with diethyl ether and dried, affording 3.6 g. of a solid copolymer melting about 76° C. On evaporation of the ether washings, there was obtained 0.8 g. of a gummy, solid copolymer and the initial filtrate from the bomb charge on evaporation yielded 1.0 g. of additional sticky copolymer, useful as an adhesive.

Infrared absorption spectra of these solid products

Example 2

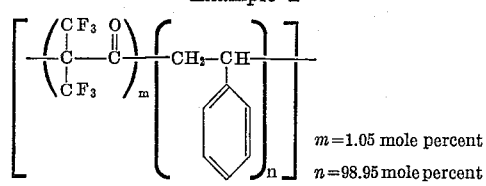

$m = 1.05$ mole percent
$n = 98.95$ mole percent

A platinum tube, ½" in diameter and 5" long, was charged with 2 g. of styrene, 3.6 g. of bis(trifluoromethyl) ketene, and 2 cc. of gaseous $N_2F_2$ as measured at atmospheric pressure, the charge being effected at liquid nitrogen temperature. The platinum tube was then sealed and heated in a pressure-resistant reaction vessel to 70° C., pressured with argon to an operating pressure of 3000 atmospheres, and held under these conditions for four hours. The bomb was then vented to atmospheric pressure, the tube removed and opened. The resulting styrene/bis(trifluoromethyl)ketene copolymer solid product was washed well in a Soxhlet extractor with refluxing methanol and finally dried under vacuum. Analysis indicated the solid copolymer to contain 1.14% of combined fluorine, which corresponde to 1.8% of combined bis(trifluoromethyl)ketene units in the copolymer.

In a fashion similar to that of Example 2, other comonomers were copolymerized with bis(trifluoromethyl) ketene with results indicated in the following table.

TABLE

| Ex. | Comonomer, grams | Bis(trifluoromethyl)-ketene, grams | Copolymer Yield, grams | Weight Percent in Product | | Formula | Mole Percent | |
|---|---|---|---|---|---|---|---|---|
| | | | | F | Bis(trifluoromethyl)ketene | | m | n |
| 3 | Butadiene, 0.54 | 18.0 | 0.2 | 13.9 | 21.5 | (structure) | 7.8 | 92.2 |
| 4 | Methyl acrylate, 0.86 | 1.8 | 0.8 | 0.87 | 1.4 | (structure) | 0.66 | 99.34 |
| 5 | Methyl methacrylate, 1.0 | 1.8 | 0.9 | 0.52 | 0.8 | (structure) | 0.46 | 99.54 |
| 6 | Acrylonitrile, 0.53 | 1.8 | 0.5 | 1.23 | 1.9 | (structure) | 0.58 | 99.42 |
| 7 | Vinyl chloride, 1.1 | 1.8 | 1.1 | 0.75 | 1.2 | (structure) | 0.41 | 99.59 |
| 8 | Vinylidene chloride, 1.0 | 1.8 | 0.7 | 0.28 | 0.4 | (structure) | 0.24 | 99.76 | showed a strong carbonyl band at 5.8 microns, supporting the structure

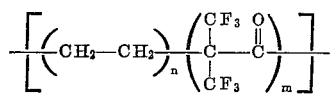

i.e., a linear copolymer of ethylene and bis(trifluoromethyl)ketene. Fluorine analysis on the solid melting at 76° C. indicated $m$ to be about 5.9 mole percent and $n$ to be about 94.1 mole percent.

Analysis.—Calcd. for $C_{36}H_{64}F_6O$: F, 18.21. Found: F, 18.30.

Example 9

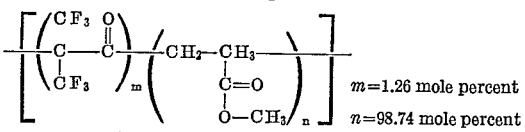

$m = 1.26$ mole percent
$n = 98.74$ mole percent

To illustrate the extremely selective and driving copolymerization tendencies of the bis(perfluoroalkyl)ketenes, the following experiment was carried out which shows the ready polymerization of the bis(perfluoroalkyl)ketene as a comonomer with another ethylenically unsaturated, addition polymerizable comonomer in the presence of a free-radical inhibitor which normally would short-stop and largely prevent both homopolymerization and copolmerization of conventional ethylenically unsaturated, addition polymyerization monomers.

A mixture of 18.5 g. of bis(trifluoromethyl)ketene, 10 g. of methyl methacrylate comonomer, 0.5 g. of hydroquinone inhibitor, and 0.5 g. of phenothiazine inhibitor were sealed in a glass tube and heated overnight on a steam bath (temperatures about 70–85° C.). The reaction tube was cooled, connected to a trap system cooled by solid carbon dioxide and opened. There was recovered in the cooled trap 17.5 parts of the initially charged bis(trifluoromethyl)ketene. The residue in the reactor was extracted with chloroform for three days. An insoluble gel remained which, after drying under vacuum, was shown by analysis to contain 1.42% fluorine and thus representing a bis(trifluoromethyl)ketene/methyl methacrylate copolymer. It is to be noted that homopolymethyl methacrylate is readily soluble in chloroform.

Example 10

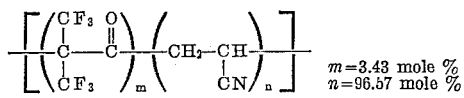

$m = 3.43$ mole %
$n = 96.57$ mole %

A glass tube was charged with 1.4 g. of acrylonitrile, 4.5 g. of bis(trifluoromethyl)ketene, and 0.05 g. of $\alpha,\alpha'$-azodiisobutyronitrile. The tube was sealed and allowed to stand at room temperature for one year. The tube was then opened and the resulting copolymer was washed in a Soxhlet extractor with acetone and finally dried. On analysis it was found to contain 6.8% of combined fluorine, indicating a copolymer of acrylonitrile and bis(trifluoromethyl)ketene.

Example 11

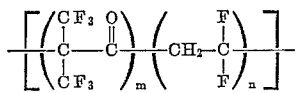

As in Example 2, a platinum tube was charged with 2 g. of vinylidene fluoride, 5.3 g. of bis(trifluoromethyl)-ketene, 2 cc. of N₂F₂, and handled under the conditions there described. On cooling and opening the tube, there was obtained 1.5 g. of a vinylidene fluoride/bis(trifluoromethyl)ketene copolymer infrared analysis on which indicated C=O absorption at 5.8 microns.

Example 12

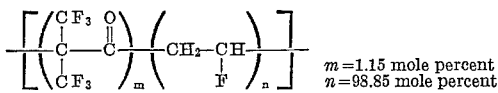

$m = 1.15$ mole percent
$n = 98.85$ mole percent

In the same fashion as described in Example 2, a platinum tube was charged with 3.6 g. of bis(trifluoromethyl)-ketene, 0.2 g. of $\alpha,\alpha'$-azodiisobutyronitrile, and 1.0 g. of vinyl fluoride. The tube was held at 70° C. for 10 hours under a pressure of 910 atmospheres. The bomb was bled to room temperature, the tube was removed and opened, and the resultant solid vinyl fluoride/bis(trifluoromethyl)-ketene copolymer was dissolved in warm dimethylformamide to form a solution suitable for film casting. The solution was filtered, and the filtrate was diluted with methanol to precipitate the polymer. The polymer was then filtered, washed with methanol, and dried.

*Analysis.*—Calcd. for (CF₃)₂C=C=O: C, 26.99; H, 0.0; F, 64.04. Calcd. for CHF=CH: C, 52.2; H, 6.5; F, 41.3. Found: C, 48.10; H, 5.35; F, 42.28.

Infrared (slight C—O absorption at 5.8μ) along with these analyses indicate copolymerization.

The above-described copolymers of perfluoroalkyl-ketene with other ethylenically unsaturated, addition polymerizable monomers are useful as film- and fiber-forming material by conventional solution spinning, solvent casting, and/or melt spinning techniques. The films are flexible enough for packaging and the fibers can be employed in fabrics. Low-softening polymers can be used as adhesives. These copolymers are particularly outstanding for their relatively high chemical inertness coupled with surprisingly good physical formability in the sense of being relatively easily handled by solution spinning or casting techniques.

Since obvious modifications and equivalents in the invention will be evident to those skilled in the chemical arts, we propose to be bound solely by the appended claims.

The embodiments of the invention in which an exclusive property or privilege is claimed are defined as follows:

1. A fiber and film forming random copolymer consisting essentially of the formula

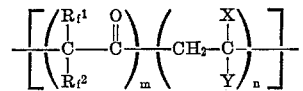

wherein $R_f^1$ and $R_f^2$ are perfluoroalkyl radicals of up to 8 carbon atoms, X is selected from the group consisting of —H, —C₆H₅, —CH=CH₂ —COOR, —CN, —Cl, and —F, R being monovalent hydrocarbon of up to 6 carbon atoms, and Y is selected from the group consisting of —H, —F, —Cl, and —R wherein R is defined above, $m$ and $n$ are mole fractions of the respective units, $m$ being between 0.1 and 50 and $n = 100 - m$.

2. A copolymer of claim 1 wherein $R_f^1$ is —CF₃ and $R_f^2$ is —CF₃.

3. A copolymer of claim 2 wherein X is —H and Y is —H.

4. A copolymer of claim 2 wherein X is —C₆H₅ and Y is —H.

5. A copolymer of claim 2 wherein X is —CH=CH₂ and Y is —H.

6. A copolymer of claim 2 wherein X is

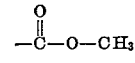

and Y is —H.

7. A copolymer of claim 2 wherein X is

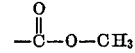

and Y is —CH₃.

8. A copolymer of claim 2 wherein X is —CN and Y is —H.

9. A copolymer of claim 2 wherein X is —Cl and Y is —H.

10. A copolymer of claim 2 wherein X is —Cl and Y is —Cl.

11. A copolymer of claim 2 wherein X is —F and Y is —F.

12. A copolymer of claim 2 wherein X is —F and Y is —H.

References Cited

UNITED STATES PATENTS 3,275,609   9/1966   Raasch _____ 260—79.7
3,377,318   4/1968   Kiss _____ 260—73

WILLIAM H. SHORT, Primary Examiner

L. L. LEE, Assistant Examiner

U.S. Cl. X.R.
260—31.8, 41, 41.5